March 22, 1960     D. R. BLUMER     2,930,015
GAS DETECTING APPARATUS
Filed Dec. 14, 1955

INVENTOR.
DONALD R. BLUMER

BY *Orvin M. Haugen*

ATTORNEY

United States Patent Office 2,930,015
Patented Mar. 22, 1960

2,930,015

GAS DETECTING APPARATUS

Donald R. Blumer, St. Paul, Minn., assignor to Minneapolis-Honeywell Regulator Company, Minneapolis, Minn., a corporation of Delaware Application December 14, 1955, Serial No. 553,025

3 Claims. (Cl. 338—13)

The present invention relates to a device for detecting noxious or combustible gases such as gaseous hydrocarbons, carbon tetrachloride and the like. The device of the present invention is particularly adapted to be used as a combustibles detector in an atmosphere which may become contaminated with a combustible vapor, such as in an engine room or the like. Heretofore, devices of this type were generally based on the hot-wire principle and as such have required rather delicate instrumentation and the like for analysis. The present invention, on the other hand is an extremely simple and rugged device which may be safely operated in any atmosphere without danger of initiating combustion in the atmosphere from a spark or the like should the atmosphere become sufficiently contaminated with combustibles. Furthermore, the device is particularly adapted for indicating conditions of atmosphere in any number of remote areas to a central control area in a substantially continuous manner.

In general, the device comprises a base mounting block having a sensitive film including a binder or carrier material impregnated with conductive particles such as carbon black or the like deposited thereon. In addition, means are provided for passing an electrical current across the film. The sensitive film is composed of a substance such that it is adapted to respond dimensionally, for example, expand or contract, in the presence of a combustible or noxious gas such as a hydrocarbon or the like.

Therefore, it is an object of the present invention to provide an improved sensing device for noxious or combustible vapors such as hydrocarbons or the like in atmospheres where these vapors may be present.

It is a further object of the present invention to provide a simple and rugged hydrocarbon sensing device including a base mounting block covered with a dimensionally sensitive film impregnated with conductive particles such as carbon black, acetylene black and the like, the film being sensitive to combustible vapors, such as hydrocarbons or the like.

The invention may be more easily and completely understood with reference to the accompanying drawing in which.

Figure 1:
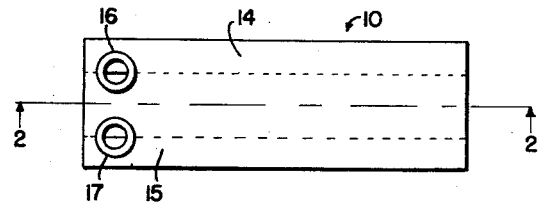
Figure 1 is a top plan view of an apparatus constructed in accordance with the present invention.
Figure 2:
Figure 2 is a vertical sectional view of the device of Figure 1 taken along the lines and in the direction of the arrows 2—2 of Figure 1.

In accordance with the preferred modification of the present invention, there is illustrated in Figures 1 and 2 a sensing device generally designated 10 comprising a base portion 11 having superimposed thereon an electrically conductive sensitive film 12. A pair of electrode members 14 and 15 are preferably attached to the top surface of the base 11 and make contact along one of their major faces with the sensitive film 12. These may be parallel electrode strips; they may have attached grids similar to the teeth of a comb or they may be of any other suitable configuration having a conductive film lying between these two electrodes or branches thereof, but being otherwise electrically separated from each other. The electrodes preferably are made of corrosion resistant metals such as silver, gold, nickel, or the like which may be vaporized, sputtered, embossed, or otherwise suitable rigidly attached in the desired configuration to the base support 11 of the element. Electrical terminals 16 and 17 are provided and extend through both the base and each of the two electrodes. They provide electrical contact with the sensitive film and are designed to provide a more convenient electrical connection thereto. The sensitive film 12 includes a carrier base material such as rubber including natural or GRS rubber, polyisobutylene, various plastic films such as chlorosulfonated polyethylene or the like, which are dimensionally sensitive to combustible or noxious vapors such as gaseous hydrocarbons, chlorinated hydrocarbons, or the like. This film is rendered electrically conductive by impregnation with finely divided conductive particles such as carbon black, acetylene black or the like. Although various films are generally useful for sensing a multitude of gases, some film forming materials are selected on the basis of their sensitivity to materials having the molecular structure of the gases which are most likely to be found contaminating the atmosphere to be controlled. As a general rule, however, smoked natural or GRS rubber are preferred as film forming compounds since they have substantially universal application for most noxious vapors. Furthermore, they are superior for application in sensing gasoline or other paraffin hydrocarbons, and also aromatic vapors such as are found in aviation fuels, benzene or the like. Polystyrene films are generally quite permeable to aromatics, and therefore have application for sensing in areas which may become contaminated with vapors of this type. Due to limitations of draftsmanship, the conductive film 12 illustrated in the accompanying drawing is shown in a slightly enlarged scale. In practice, this film will be relatively thin, preferably of the order of 0.015 mil. In most applications, however, a film thickness of from about 0.01 to about 0.10 mils is generally satisfactory and provides relatively fast response. However, it is to be noted that as the film thickness increases, the sensitivity of the device decreases and the response time increases. If desirable, a very thin permeable protective film may be deposited over the sensitive film in order to protect the sensing film from dust or other contaminants which may cause resistance variations in the sensing film other than resistance changes resulting from combustible or noxious vapors absorbed in the sensing film.

For conductivity purposes, the film is impregnated with adequate quantities of finely divided conductive particles. These conductive particles may be suitable grades of finely divided carbon black, very fine carbon or graphite powders, silicon, silicon carbide, silicon boride, or similar conducting or semiconductor type powders, or very finely divided metal powders, preferably of colloidal dimensions. It is desirable that these powders be very stable chemically and corrosion resistant so that their resistance properties do not change appreciably while contained or incorporated on such detecting films.

In this connection, the film is impregnated with a sufficient quantity of conductive particles to meet the conductivity requirements of the sensing system utilized. For example, the resistance requirements of the sensing device may be determined by the resistance desired in the element when a dangerous concentration of the noxious vapors undergoing determination are included in an atmosphere. As a general rule, for the usual types of sensing systems available it is preferable to utilize a quantity of carbon black ranging from 10 to 70 percent of the weight of the binder film; however, it is possible to use a range of between 35 and 45 percent for most purposes. If acetylene black is used as the conductive filler, a relatively lower quantity of this material will be used for similar results. In the case of finely divided carbon particles, the resistance of such a film containing up to 10 percent by weight of the black may, in some cases, increase with increasing carbon concentration due to absorptive fixing of conductive impurities from the plastic or rubber binder material itself on the surface of the carbon black. Generally, such films containing greater than 0 and up to about 10 percent by weight of carbon black are not as satisfactory for this purpose as those containing somewhat more of this material. On the other hand, if the concentration of carbon black particles exceeds about 70 percent by weight of the film, the conductivity is very high and relatively constant so that it is difficult to measure relatively small changes in the carbon black concentration in the film corresponding to relatively small changes in the concentration of hydrocarbons or the like in the atmosphere and hence of this material absorbed in the sensing film.

In operation, it is seen that the resistance of the device will increase as the carrier medium swells due to contact with the various vapors. For example, as the carrier film expands, the various conductive particles are moved relatively farther and farther apart, thereby decreasing the conductivity paths between the units or increasing the resistance of the film. In this device, particle-to-particle contact provides the conductive path between the electrodes.

The material of the base mounting member is preferably a substance insensitive to the gaseous material being detected. In this connection ceramic or ordinary plastic materials having relatively dense exteriors and having low solubility or absorptive capacity for such vapors have been found suitable. Allyl carbonate polymers, various glasses such as Pyrex, vycor, quartz or the like form suitable base materials. If the sensing film is very thin and dimensionally very sensitive to changes in concentration of hydrocarbon or other organic vapors in the ambient atmosphere and the base support material is very stable dimensionally to such concentration changes of the organic vapor in the ambient atmosphere, the unit is more likely to stay in calibration over relatively long periods of time and will have less hysteresis, and hence will require less periodic recalibration attention.

In actual production, the base member 11 is first prepared with a clean major surface capable of receiving and holding a sensitive coating of the type described herein. This member is then provided with a pair of suitable electrodes 14 and 15 along the edges thereof or otherwise suitably arranged. Electrical contact is made to the electrodes through the terminal sleeves 16 and 17. The sensitized film is then applied over the base by spraying, painting or otherwise applying an emulsion or dispersion of the powdered conductor material in a solution of the rubber or other suitable plastic binder material in a suitable hydrocarbon, organic solvent, or other dispersion medium which will evaporate from the coating to leave a film comprising a uniform dispersion of the powdered conductor material in the plastic or other film-forming material. Alternatively, the element may be dipped into the liquid coating dispersion, slowly withdrawn, and the solvent or dispersion medium allowed to evaporate therefrom to leave a coating film. Any of these procedures may have to be repeated several times in order to build up the film to a sufficient thickness to have the electrical properties desired.

It is advantageous to add to these coating dispersions a suitable wetting agent or medium capable of modifying the surface tension of the organic solvent and dissolved material so that the fine particles of conducting material will be brought into as intimate contact as possible with the rubber or other plastic film-forming materials used therein. This is desirable to prevent gradual segregation of the powdered conductor in the sensing film as this film is exercised by exposure to atmospheres containing variable amounts of hydrocarbon vapors.

Figure 3:
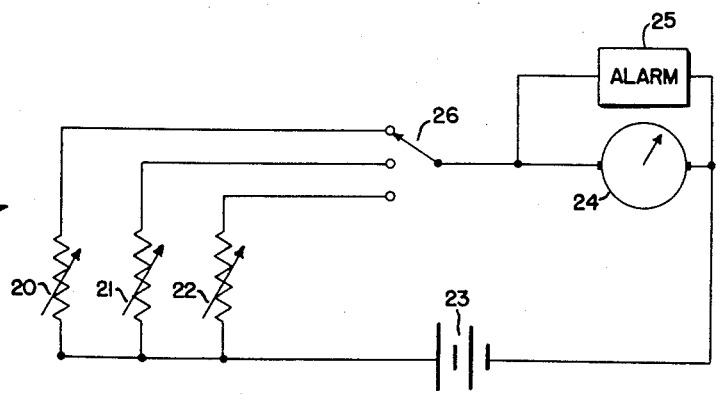
Figure 3 is a schematic drawing of an electrical alarm circuit employing the plurality of sensing elements, each constructed in accordance with the present invention.

Attention is now directed to Figure 3 wherein there is schematically illustrated a plurality of units which are adapted to sense the atmosphere in various remote areas. Hence there are shown the sensing elements 20, 21, and 22, each of which is preferably constructed in accordance with the devices as set forth herein. A suitable power source 23 is provided which may be either a battery or alternating current power supply. An indicating device such as the meter 24 is provided in the circuit and may be, for example, a high sensitivity resistance meter, a microammeter, or the like. An alarm 25 may also be provided in order to give visual or audible response when the resistance of a sensing device becomes too low. Switching means are provided at 26 whereby the areas under observation may be selectively checked. If desired, the selector 26 may operate to periodically bring various of the elements 20-22 into the circuit. In this manner, substantially constant attention may be directed to the various zones undergoing control.

When a device of the present invention is provided with a film having the proper thickness, substantially instantaneous response may be expected. Therefore, proper protective measures may be taken without undue delay since the alarm system may be calibrated to operate before the danger of explosion or danger of gas poisoning becomes too great.

A description of various specific examples is given in the following paragraphs.

EXAMPLE I

A preparation of a raw carbon dispersion including solvents was prepared as follows:

| Percent By Weight | Component |
| --- | --- |
| 2.55 | Smoked natural rubber. |
| 1.70 | Carbon black. |
| 95.75 | Solvents (1:1 by volume mixture of xylene and n-pentane). |

The smoked natural rubber sheet, and the solvents were mixed together and placed in a ball-mill using porcelain balls, and milled overnight. The carbon black was added and permitted to thoroughly disperse in a ball-mill for a period of about four days, thereby producing a rubber-carbon black dispersion in the solvents. The solution was then then applied to a backing strip which had a pair of electrodes spaced by an insulating material. The backing plate included a steel plate (2½" x ⅝" x 1/32") covered with a baked-on ceramic insulating coating, having fired silver enamel electrodes along the edge surfaces thereof. There was a ¼" wide ceramic insulating strip available between the two silver electrodes. The element was placed on a flat surface and the prepared suspension was applied dropwise to the top surface of the element. Care was taken to cause the various drops to flow together and remain smooth on the surface of the blank. The solvent was evaporated by air drying, thereby forming a rubber-carbon black film on one face of the element blank. The element was then exercised by subjecting it to several cycles of various concentrations of n-pentane and n-hexane vapors. After this treatment, the element was placed in an atmosphere of n-hexane in air and the resistance values read therefrom as shown in Table I below.

Table I

| Resistance of Element in 1,000 Ohms | Concentration of n-Hexane Vapor in Air in Percent by Volume |
|---|---|
| 202 | 0.00. |
| 245 | 0.37. |
| 305 | 0.75. |
| 560 | 1.49. |
| Infinite | Air saturated with n-hexane vapor. |

EXAMPLE II

A mixture of rubber, carbon black and solvent was prepared as follows:

| Percent By Weight | Component |
|---|---|
| 5.40 | GRS 1501 rubber. |
| 1.82 | Carbon black. |
| 92.78 | Solvents (1:1:1 by volume of naptha, xylene, and n-hexane). |

The rubber sheet was cut up and weighed and covered with a quantity of naphtha. The container was then tightly capped and the rubber was allowed to swell in the solvent overnight. An equal quantity of xylene was then added with vigorous shaking until the rubber was completely dissolved. The carbon black was then added to the solution and shaken vigorously until suspended. The n-hexane was then added to the solution, and the entire mixture was ball-milled in a suitable container using porcelain balls. The milling operation was continued for several days in order to insure complete dispersion of the carbon black in the rubber solution. The prepared solution was applied to an element base which comprised a polished allyl carbonate polymer blank having an interlocking grid network of embossed gold electrodes, eleven legs in one comb and twelve legs in the other. The width of the electrode grids and the spaces between them were 0.025", and the length of each grid was $17/32$". The over-all length of each comb base leg to which grids were attached was $15/8$", and the width thereof about $3/32$". The enlarged comb base leg ends were firmly connected to gold-plated brass eyelets inserted through two holes in the upper portion of the plastic base with the enlarged gold electrode grid ends swaged into tight contact with the gold foil electrodes. The base plate to which the electrodes were embossed was approximately $1 3/4$" x $1 1/2$" x $1/8$". The element blank was then dipped four times into the rubber-carbon black dispersion using a withdrawal time ranging from about 17 to 21 minutes. This was followed by one hand dipping operation with a relatively rapid withdrawal time of about two minutes. The element was then air dried at room temperature for several hours and exercised by exposing alternately to air free of hydrocarbon vapors and air saturated with n-hexane vapors for 10–15 cycles or until the resistance value in air remains constant before calibration. The data obtained with the element in contact with a mixture of n-hexane and air is given in Table II below.

Table II

| Resistance of Element in 1,000 Ohms | Concentration of n-Hexane Vapor in Air in Percent by Volume |
|---|---|
| 150 | 0.00. |
| 200 | 0.37. |
| 230 | 0.75. |
| 260 | 1.12. |
| 300 | 1.87. |
| 560 | 3.74. |
| 9,000 | Air saturated with n-hexane vapor. |

Although various embodiments of the invention have been disclosed herein, it is appreciated that these are shown for purposes of illustration, and are not intended to be limitations, and it is therefore my intention that the scope of the present invention be determined by the appended claims.

I claim as my invention:

1. Condition responsive means for detecting the presence of hydrocarbon gases and the like in an atmosphere comprising a base member, a relatively thin electrically conductive layer situated upon said base member and respond to said condition, and means for passing an electrical current across said layer, said layer including a normally nonconductive plastic binder material selected from the class consisting of polystyrene, smoked natural and GRS rubber and impregnated with finely divided conductive material selected from the class consisting of carbon black and acetylene black dispersed through said binder in an amount ranging from 35 percent to 45 percent based on the weight of the binder to render said binder conductive.

2. Condition responsive means for detecting the presence of hydrocarbon gases or the like in an ambient atmosphere comprising a base member, a relatively thin electrically conductive layer situated upon said base member and responsive to said condition, and means for passing an electrical current across said layer, said layer including a polystyrene binder material impregnated with finely divided conductive material taken from the class consisting of carbon black and acetylene black dispersed through said binder in an amount ranging from 35 percent to 45 percent based on the weight of the binder.

3. Condition responsive means for detecting the presence of hydrocarbon gases or the like in an ambient atmosphere comprising a base member, an electrically conductive layer situated upon said base member and responsive to said condition, and means for passing an electrical current across said layer, said layer including a rubber carrier material selected from the class consisting of polystyrene, smoked natural and GRS rubber, and being from between 0.01 and 0.10 mils thick, and being impregnated with finely divided conductive material selected from the class consisting of carbon black and acetylene black dispersed through said carrier in an amount ranging from 35 percent to 45 percent based on the weight of the carrier.

References Cited in the file of this patent

UNITED STATES PATENTS

| | | |
|---|---|---|
| 2,333,476 | Duston | Nov. 2, 1943 |
| 2,473,183 | Watson | June 14, 1949 |
| 2,510,018 | Gillingham | May 30, 1950 |
| 2,589,983 | Blodgett | Mar. 18, 1952 |
| 2,701,832 | Marsden et al. | Feb. 8, 1955 |
| 2,714,149 | Craig et al. | July 26, 1955 |
| 2,741,912 | Schultze | Apr. 17, 1956 |
| 2,793,526 | Dalglish | May 28, 1957 |